United States Patent [19]
Warnick et al.

[11] Patent Number: 6,154,577
[45] Date of Patent: *Nov. 28, 2000

[54] DIGITAL IMAGE PROCESSING METHOD AND COMPUTER PROGRAM PRODUCT

[75] Inventors: James Warnick, Pittsford; Chris W. Honsinger, Webster, both of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/752,018

[22] Filed: Nov. 13, 1996

[51] Int. Cl.$^7$ .................................................. G06K 15/316
[52] U.S. Cl. ..................... 382/279; 382/199; 382/266; 382/269; 382/278
[58] Field of Search ................................. 382/278, 279, 382/199, 266, 269

[56] References Cited

U.S. PATENT DOCUMENTS

| | | | |
|---|---|---|---|
| 4,384,358 | 5/1983 | Shiki et al. | 375/38 |
| 4,685,143 | 8/1987 | Choate | 382/22 |
| 4,972,359 | 11/1990 | Silver et al. | 364/718 |
| 5,212,740 | 5/1993 | Paek et al. | 382/22 |
| 5,260,969 | 11/1993 | Kato et al. | 375/106 |
| 5,485,534 | 1/1996 | Takemoto et al. | 382/22 |
| 5,717,789 | 2/1998 | Anderson et al. | 382/191 |
| 5,822,458 | 10/1998 | Silverstein et al. | 382/235 |
| 5,835,639 | 11/1998 | Honsinger et al. | 382/279 |
| 5,859,920 | 1/1999 | Daly et al. | 382/203 |

OTHER PUBLICATIONS

John Canny "A compution approach to edge detection", IEEE transaction on patt analysis and machine Intelligence. Volumn pami–8 No. 6, Nov. 1986, pp. 679–698, 1986.
Steve walton "Image authentication for a slippery new age", Dr Dobbs journal, (Apr. 1995) pp. 18–27.
Jack D. Gaskill, "Convolution", Linear Systems, Fourier Transforms, and Optics, pp. 172–176.
S. Walton, "Image Authentication for a Slippery New Age", Apr. 1995, *Dr. Dobb's Journal*, pp. 18–27.
J. Canny, "A Computational Approach to Edge Detection", 1986, *IEEE Transactions of Pattern Analysis and Machine Intelligence*, vol. PAMI–8, No. 6, pp. 112–131.
W. K. Pratt, "Digital Image Processing", 1978, John Wiley & Sons, pp. 479–487.

*Primary Examiner*—Matthew C. Bella
*Assistant Examiner*—Sheela Chawan
*Attorney, Agent, or Firm*—Thomas H. Close

[57] ABSTRACT

A digital image processing method for detecting when and where an image has been altered or modified includes the steps of generating an edge map of an original digital image; convolving the edge map with a carrier signal to generate a dispersed edge map; and combining the dispersed edge map with the original digital image to create a combined image. The combined digital image is checked to determine if it has been modified by correlating the carrier signal with the combined image to produce a recovered edge map; and comparing the recovered edge map with the original image to detect modifications to the combined image.

14 Claims, 2 Drawing Sheets

DIGITAL IMAGE PROCESSING METHOD AND COMPUTER PROGRAM PRODUCT

CROSS-REFERENCE TO RELATED APPLICATIONS

The present application is related to U.S. application Ser. No. 08/565,804, filed Nov. 30, 1995, by Scott J. Daly et al., and entitled, "Method For Embedding Digital Information In An Image", and U.S. application Ser. No. 08/596,818, filed Feb. 5, 1996, by Scott J. Daly, and entitled, "Method and Apparatus for Hiding One Image or Pattern Within Another".

APPENDIX

The disclosure in the appendix of this patent disclosure contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to the field of digital image processing, and in particular to digital image processing methods and apparatus for detecting modifications of a digital image.

BACKGROUND OF THE INVENTION

It is often desirable to determine whether an image has been retouched or altered from its original form. For example, if a photograph is offered as evidence in a legal proceeding, it is important to know whether the photograph has been modified from the original. In digital image processing, this process has been referred to as "image authentication" (see "Image Authentication for a Slippery New Age" by Steve Walton, Dr. Dobb's Journal, April, 1995, page 18 et seq.). The approach describe by Walton envisions adding checksum bits directly to the digital image so that if any pixel(s) is changed, the checksum will change thus identifying the image as having been modified. Although useful, this approach suffers from several shortcomings. If the image has been printed and then redigitized, the checksum information is lost so that further modifications of the image cannot be detected. The addition of even a small amount of noise to the digital image or resizing, cropping, tone scaling, or rotation of the image frustrates the operation of the technique. Further, the technique described by Walton only indicates that some change has been made to the image, but does not show where or what changes have been made. It would be desirable therefore to provide an improved digital image processing method for detecting when and where an image has been retouched or modified.

SUMMARY OF THE INVENTION

The present invention is directed to overcoming one or more of the problems set forth above. Briefly summarized, according to one aspect of the present invention, a digital image processing method for detecting when and where an image has been altered or modified includes the steps of generating an edge map of an original digital image; convolving the edge map with a carrier signal to generate a dispersed edge map; and combining the dispersed edge map with the original digital image to create a combined image. The combined digital image can be later checked to determine if it has been modified by correlating the carrier signal with the combined image to produce a recovered edge map; and comparing the recovered edge map with the original image to detect modifications to the combined image.

The present invention is advantageous in that it provides an unobtrusive means of ensuring that no changes have been made to an image, or if such change has been made, the method provides information on the location and nature of the change. The invention can be readily implemented in digital capture devices such as digital cameras and scanners. The technique of the invention has the further advantage that it withstands printing and redigitizing of the image so that modifications in photographic prints and transparencies may be detected.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figures 1, 2:
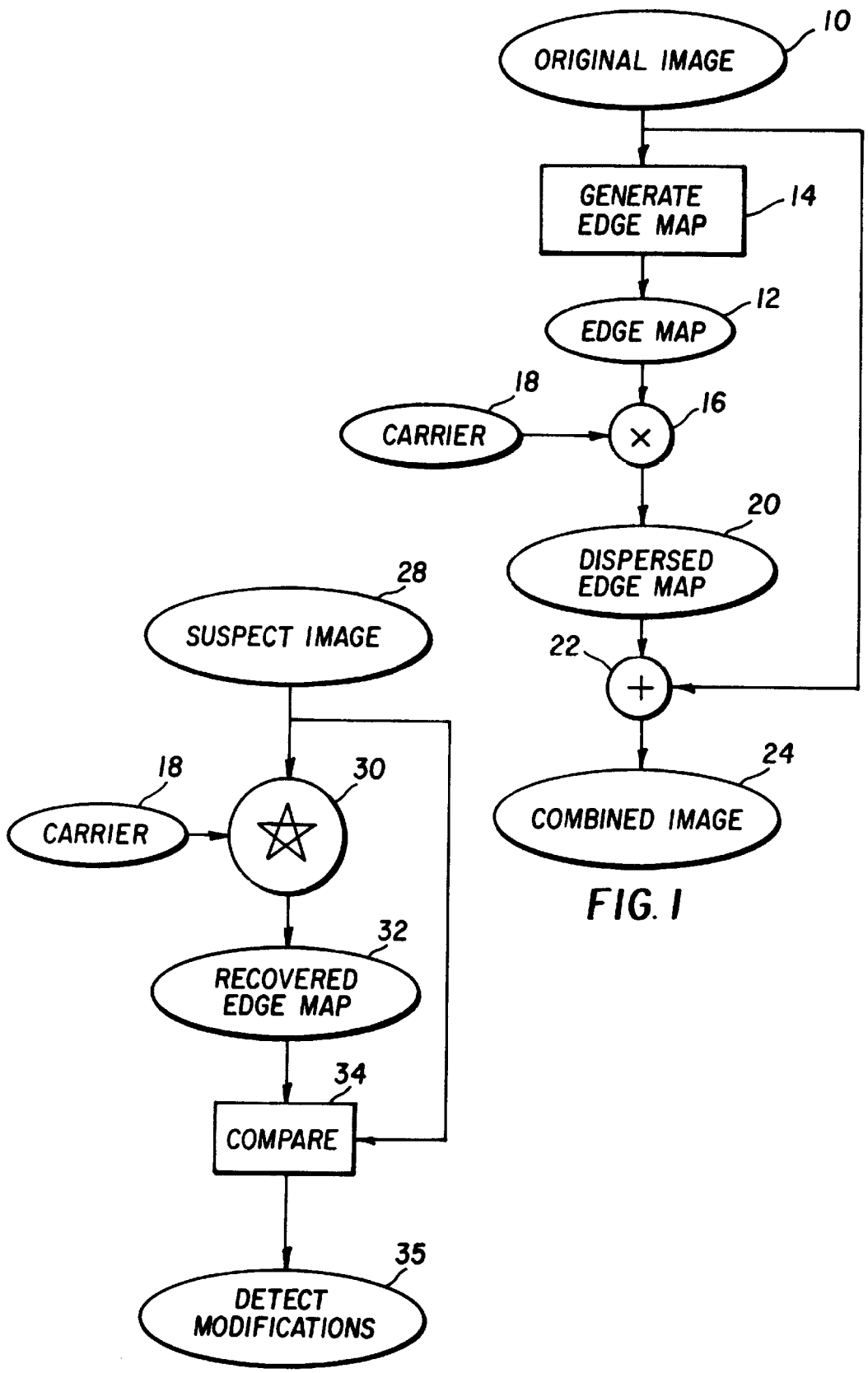
FIG. 1 is a flow chart illustrating the digital image encoding process of the present invention.
FIG. 2 is a flow chart illustrating the image modification detection process of the present invention.

Beginning with FIG. 1, an original digital image 10 is provided. The original digital image 10 may be provided directly from a digital image source, such as a digital electronic camera or graphic arts application on a computer, or may be produced from a photograph or art work by scanning. The digital image 10 may be a still image, or a frame of a motion picture sequence or video image. An edge map 12 of the digital image 10 is generated 14 in a digital image processor, such as a programmed personal computer or special purpose digital image processing hardware. The edge map 12 may be generated in any one of the known digital image processes for extracting edge information from a digital image. For example, a thresholded gradient detector may be employed (See William K. Pratt, *Digital Image Processing,* John Wiley & Sons, New York, 1978, pp. 479–487). A presently preferred edge detector is the Canny edge detector (see John Canny, "A Computational Approach to Edge Detection", IEEE Transaction on Pattern Analysis and Machine Intelligence, Volume PAMI-8, No. 6, November 1986, pp. 679–698). Alternatively, the edge map 12 may be generated by convolving the image 10 with an edge map kernel such as a Sobel edge detector.

The edge map 12 is convolved 16 with a carrier 18 to disperse the edge map 12 throughout the spatial domain, resulting in a dispersed edge map 20. The carrier 18 is selected to simultaneously minimize the visibility of the edge map 12 while maintaining a good autocorrelation property as will be described below. A presently preferred carrier is a two dimensional pattern having a random phase and a flat frequency amplitude spectrum. The preferred two dimensional carrier is derived by setting the amplitude of the Fourier coefficients to a single value while randomizing the phase.

A presently preferred two dimensional carrier is derived by setting the Fourier amplitude to a constant value while choosing a random number to represent phase. To ensure that a real (not imaginary) inverse transform is produced, a Fourier transform intended for real (not complex) input data should be used.

The Fourier amplitude value may be increased to overcome the inherent noise due to the interaction of the original image data with the dispersed edge map. If desired, the visibility of the dispersed edge map 20 in the combined image 24 may be minimized by taking into account the spatial frequency response of the human visual system as described in copending patent application U.S. application Ser. No. 08/596,818, filed Feb. 5, 1996, by Scott J. Daly for "Method and Apparatus for Hiding One Image or Pattern Within Another". The carrier amplitude spectrum is divided by the contrast sensitivity function that is associated with the human visual system. This will maximize the amount of energy that one can embed in the image at a given level of visual detection.

The dispersed edge map 20 is combined 22 with the original image 10 to produce a combined image 24. The images are combined, for example, by adding the images pixel by pixel. The resulting combined image 24 may now be released to the public for intended use. Tampering, retouching, or modification of the combined image can be detected as described below.

Figure 3:
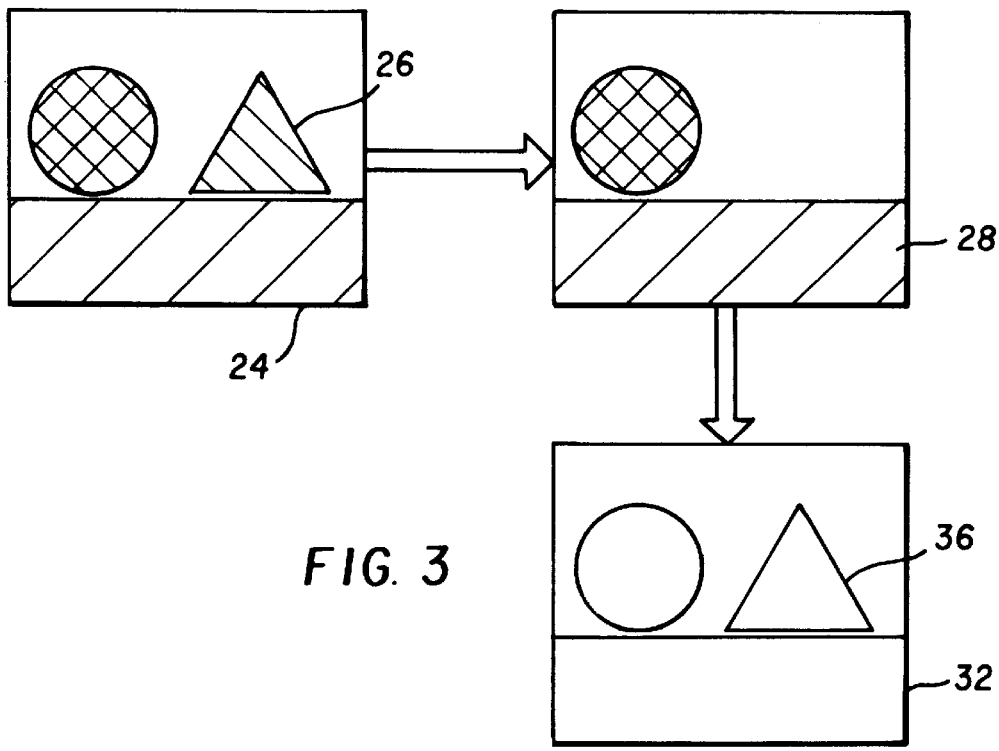
FIG. 3 is an illustration useful in describing the operation of the invention.

Referring to FIGS. 2 and 3, the combined image 24 may be modified, for example by removing an object 26 to produce a suspect image 28 that is presented as an unmodified combined image. To detect whether the suspect image 28 has been modified, it is correlated 30 with the carrier 18 to produce a recovered edge map 32. Since the original edge map 12 was dispersed throughout the spatial domain by correlation with the carrier 18, the edge map may be recovered even though a portion of the combined image 24 was removed when object 26 was removed. The original edge map 12 will be recovered by correlation with the carrier 18 even when the image has been modified by relocating portions of the image or when portions of a different image are substituted in the combined image 24. The digital image may even be printed and then redigitized without affecting the recovery of the edge map 12.

The recovered edge map is mathematically the same as the autocorrelation of the carrier convolved with the edge information. Added to this is a noise which mathematically is the cross-correlation of the carrier with the image. By design, the desired edge map is larger in amplitude than the noise since the carrier is matched to the dispersed edge map and not the image.

Therefore, the quality of the recovered edge map is substantially influence by the auto correlation of the carrier. If the autocorrelation of the carrier is a delta function or a spike, then the recovered edge map is identical to the original edge map. If the autocorrelation of the carrier has significant sidelobes, then the recovered edge map will have ghosts of the original edges that are generated by the carrier autocorrelation sidelobes.

Finally, the recovered edge map 32 is compared 34 with the suspect image 28 to detect modifications 35 that have been made to the combined image 24. Differences in the edge content of the two images indicate where and how the suspect image has been modified. For example, the edge object 36 of the deleted object 26 can clearly be seen in the recovered edge map 32. The comparison is readily performed by visual inspection of the images. Alternatively, the comparison of the images may be performed automatically by generating an edge map of the suspect image 28 and subtracting it from the recovered edge map 32, resulting in a map of the differences between the two edge map images. This approach will reveal more subtle modifications contained in the suspect image 28.

A computer program written in the C++ language suitable for performing one embodiment of the method of the present invention on a Sun SPARC workstation is included in Appendix A. The routine called EMBED embeds the edge map into an image. The routine called EXTRACT extracts the embedded edge map from a combined image. The routine called ORTHO creates the carrier signal according to the preferred method disclosed above.

Figure 4:
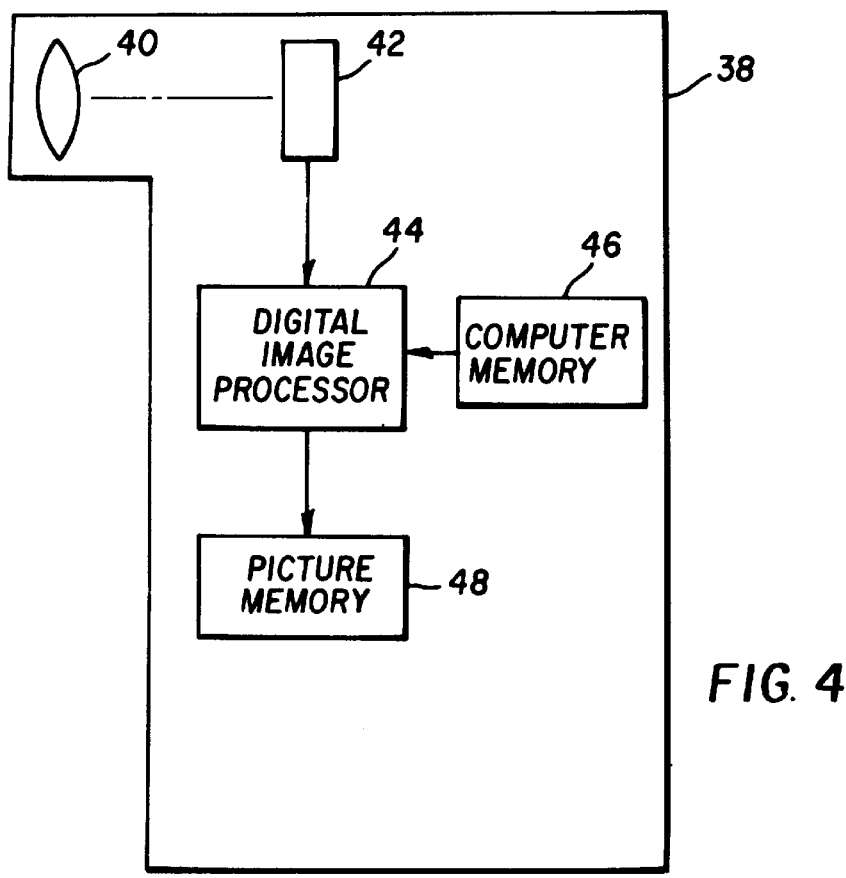
FIG. 4 is a schematic diagram of an image capture device employing the present invention.

The method of the present invention may be embodied in an image capture device such as a digital camera or a scanner. As shown in FIG. 4, a digital electronic camera 38 includes lens 40 for forming an image on a solid state image sensor 42. The signal from the image sensor 42 is supplied to a digital image processor 44 that performs the encoding portion of the present invention that was described with respect to FIG. 1. The carrier 18 and programs for performing the encoding process are stored in a computer memory 46 associated with the digital image processor. The combined image 24 is stored in a picture memory 48 in the camera.

A measure of security can be obtained by providing a unique carrier 18 for each camera or scanner. As a result, only a person in possession of the unique carrier, such as the owner of the camera would be able to detect modifications of the image, thereby frustrating attempts to defeat the system by modifying the image and reinserting a modified edge map.

The invention as described above can be applied to either black and white or color images. In the case of black and white images, modifications to object locations as well as object textures can be detected. In the case of color images, the approach described above can be applied to each color component (e.g. R, G, B) separately, thus providing the ability to detect modifications to object colors as well as object locations and textures. Additionally, the step of edge map generation 14 can be different for each color component, allowing optimization for the specific characteristics (e.g. edge sharpness) of each color component. Those skilled in the art will appreciate that the method of the present invention may be applied to the color components of an image represented in alternative color spaces such as YCC or Lab.

The invention has been described with reference to a preferred embodiment. However, it will be appreciated that variations and modifications can be effected by a person of ordinary skill in the art without departing from the scope of the invention.

APPENDIX A

SECTION 1
EMBED

```
#include "image.h"
void main(int argc, char *argv[ ])
{
    if(argc<5)
```

APPENDIX A-continued

SECTION 1
EMBED

```
{
    printf("\n\nUsage: embed image message chirp max_amp out");
    exit(1);
}
else
{
    //Initialize (read into memory) the image we wish to embed the
    message image a(argv[1]);
    // Initialize (read into memory) the message image
    image m(argv[2]);
    // Initialize (read into memory) the carrier image
    image c(argv[3]);
    // Since the amplitude of the convolved mage and carrier is
    arbitrary,
    // we allow the user to determine its' value on the command line
    float newmax=atof(argv[4]);
    // Dump out the input parameters in order to inform the user
    // what the program has read them as
    printf("\nInput: %s",argv[1]);
    printf("\nOutput: %s",argv[5]);
    printf("\nMessage: %s",argv[2]);
    printf("\nChirp: %s", argv[3]);
    // Convolve the message with the carrier
    fftmult(&m,&c,CONVOLVE);
    int ib=0,1=0,ii=0;
    // Go through a routine to find the current maximum of the
    convolution float curmax=m.get_pixel(0,ii,1);
    for(1=0;1<m.get_nlin( );1++)
    {
        for(ii=0;ii<m.get_npix( );ii++)
        {
            curmax=MAX(m.get_pixel(0,ii,1),curmax);
        }
    }
    // Now scale the convolved data to the users requested maximum
    for(1=0;1<m.get_nlin( );ii++)
    {
        for(ii=0;ii<m.get_npix( );ii++)
        {
            m.put_pixel(newmax*m.get_pixel(0,ii,1)/
            curmax,ib,ii,1);
        }
    }
    //Now add the image to the scrambled and scaled message
    //We could have said a=a+m; if we had operator overloads
    a.deepcpy(a.operate(1.,"+",1.m,0.));
    // Save the embedded image
    a.save(argv[5]);
}
}
```

APPENDIX A

SECTION 2
EXTRACT

```
#include "image.h"
void main(int argc, char *argv[ ])
{
    if(argc<4)
    {
        printf("\n\nUsage: extract original_image carrier_image
        out_image");
        printf("\nExtracts an embedded message from an image");
        exit(1);
    }
    else
    {
        // Read original image
        image a(argv[1]);
        // Read carrier image
        image c(argv[2]);
        // Let user reflect on input values
```

APPENDIX A-continued

SECTION 2
EXTRACT

```
        printf("\nInput: %s",argv[1]);
        printf("\nChirp: %s", argv[2]);
        printf("\nOut: %s", argv[3]);
        // Correlate original image with carrier
        // fftmult places the result back in a
        fftmult(&a,&c,CORRELATE);
        // Save the result!
        a.save(argv[3]);
    }
}
```

APPENDIX A

SECTION 3
ORTHO

```
// This code produce the random carrier signal
#include "image.h"
#define SWAPF(a,b) tempr=(a);(a)=(b);(b)=tempr
#define ISPOW2(a) ((int)(256.*(double)log(a)/log(2.))==(256*(int)(log(a)/log(2.))))
double pi2=8.*atan(1.);
#define rrf(x,y) ((cos(x)*cos(y)+sin(x)*sin(y)))
#define rif(x,y) ((cos(x)*sin(y)-sin(x)*cos(y)))
void main(int argc, char *argv[ ])
{
    if(argc<2)
    {
        printf("\n\nUsage: ortho seed dim [rmin]\n");
        exit(1);
    }
    else
    {
        int seed = atoi( argv[1]);
        int dim = atoi(argv[2]);
        double val,r,i,r1,i1;
        int p,1,pp=dim,p2=dim/2;
        int 11=dim,12=dim/2;
        image imaginary(1,pp,11,32);
        image real(1,pp,11,32);
        srand(seed);
        double rmin=0;
        if(argc==4) rmin=atof(argv[3]);
printf("\nZeroing at r = %15.5f\n",rmin);
        double x,y;
        int ix,iy;
        for( 1=0;1<12; 1++)
        {
            for(p=0;p<p2;p++)
            {
                x=(double) pi2*rand( )/(RAND_MAX);
                y=(double) pi2*rand( )/(RAND_MAX);
                //UL
    //          printf("%10.5f\n", rrf(-x,y));
                real.put_pixel(rrf(-x,y),0,p2-p,12-1);
                //UR
                real.put_pixel(nf(x,y),0,p+p2,12-1);
                //LL
                real.put_pixel(rrf(-x,-y),0,p2-p,1+12);
                //LR
                real.put_pixel(rrf(x,-y),0,p+p2,1+12);
                //UL
                imaginary.put_pixel(rif(-x,y),0,p2-p,12-1);
                //UR
                imaginary.put_pixel(rif(x,y),0,p+p2,12-1);
                //LL
                imaginary.put_pixel(rif(-x,-y),0,p2-p,1+12);
                //LR
                imaginary.put_pixel(rif(x,-y),0,p+p2,1+12);
            }
        }
        for( 1=0;1<12; 1++)
        {
```

APPENDIX A-continued

SECTION 3
ORTHO

```
        x=(double) pi2*rand( )/(RAND_MAX);
        y=(double) pi2*rand( )/(RAND_MAX);
        real.put_pixel(rrf(0,y),0,p2,1+1);
        real.put_pixel(rrf(0,-y),0,p2,11-1-1);
        imaginary.put_pixel(rif(0,y),0,p2,1+1);
        imaginary.put_pixel(rif(0,-y),0,p2,11-1-1);
    }
    for( p=0;p<p2; p++)
    {
        x=(double) pi2*rand( )/(RAND_MAX);
        y=(double) pi2*rand( )/(RAND_MAX);
        real.put_pixel(rrf(x,0),0,p+1,12);
        real.put_pixel(rrf(-x,0),0 ,pp-p-1,12);
        imaginary.put_pixel(rif(x,0),0,p+1,12);
        imaginary.put_pixel(rif(-x,0),0,pp-p-1,12);
    }
    real.put_pixel(0,0,p2,12);
    imaginary.put_pixel(0,0,p2,12);
    double radius=0.0;
    if(rmin>0)
    {
        printf("\nHallowing\n");
        for(1=0;11;1++)
        {
            for(int p=0;p<pp;p++)
            {
                radius = (p-p2)*(p-p2)+(1-12)*(1-12);
                radius = pow( radius, .5);
                if(radius <= rmin)
                {
                    val = real.get_pixel( 0, p,1);
                    val *= pow( (1.0-(rmin - radius )/rmin),2);
                    real.put_pixel(val,0, p,1);
                    val = imaginary.get_pixel( 0, p,1);
                    val *= pow( (1.0-(rmin - radius )/rmin),2);
                    imaginary.put_pixel(val,0, p,1);
                }
            }
        }
    }
    _fft(&real,&imaginary,-1);
    char out[128];
    sprintf(out,"ortho_%d_%d.tif",dim,seed);
    real.save(out);
    }
}
```

PARTS LIST 10 original image
12 edge map
14 generate edge map step
16 convolve step
18 carrier
20 dispersed edge map
22 combination step
24 combined image
26 object
28 suspect image
30 convolution step
32 recovered edge map
34 comparison step
35 detect modification step
36 edge map of object
38 digital electronic camera
40 lens
42 solid state image sensor
44 digital image processor
46 computer memory
48 picture memory

We claim:

1. A digital image processing method, comprising the steps of:
   a) generating an edge map of an original digital image;
   b) convolving the edge map with a carrier signal that disperses the edge map throughout the spatial domain to generate a dispersed edge map; and
   c) combining the dispersed edge map with the original digital image to create a combined image.

2. The digital image processing method claimed in claim 1, further comprising the steps of:
   d) correlating the carrier signal with the combined image to produce a recovered edge map; and
   e) comparing the recovered edge map with the original image to detect modifications to the combined image.

3. The digital image processing method claimed in claim 2, wherein the step of comparing further comprises the steps of generating an edge map of the combined image and comparing it to the recovered edge map.

4. The digital image processing method claimed in claim 1, wherein the step of generating an edge map employs a thresholded gradient detector.

5. The digital image processing method claimed in claim 1, wherein the step of generating an edge map employs a Canny edge detector.

6. The digital image processing method claimed in claim 1, wherein the carrier signal is a random phase signal having a flat frequency amplitude.

7. The digital image processing method claimed in claim 1, wherein the step of combining comprises adding the amplitudes of the original image and the dispersed edge map pixel by pixel.

8. The digital image processing method claimed in claim 2, wherein the modification is a change in object location from the original digital image.

9. The digital image processing method claimed in claim 2, wherein the modification is a change in object texture from the original digital image.

10. The digital image processing method claimed in claim 2, wherein the digital image is a color digital image and the modification is a change in object color from the original digital image.

11. A computer program product, comprising: a computer readable storage medium having a computer program stored thereon for performing the steps of:
- a) generating an edge map of an original digital image;
- b) convolving the edge map with a carrier signal that disperses the edge map throughout the spatial domain to generate a dispersed edge map; and
- c) combining the dispersed edge map with the original digital image to create a combined image.

12. The computer program product claimed in claim 11, wherein the computer program further performs the steps of:
- d) correlating the carrier signal with the combined image to produce a recovered edge map; and
- e) comparing the recovered edge map with the original image to detect modifications to the combined image.

13. Digital image capture apparatus, comprising:
- a) a digital image sensor for producing a digital image signal; and
- b) a digital image processor for processing the digital image signal including,
  - i) means for generating an edge map of the digital image;
  - ii) means for convolving the edge map with a carrier signal that disperses the edge map throughout the spatial domain to generate a dispersed edge map; and
  - iii) means for combining the dispersed edge map with the original digital image signal to create a combined digital image signal.

14. The digital image capture apparatus claimed in claim 13, further comprising a memory for storing the combined digital image signal.

* * * * *